Figure 1:
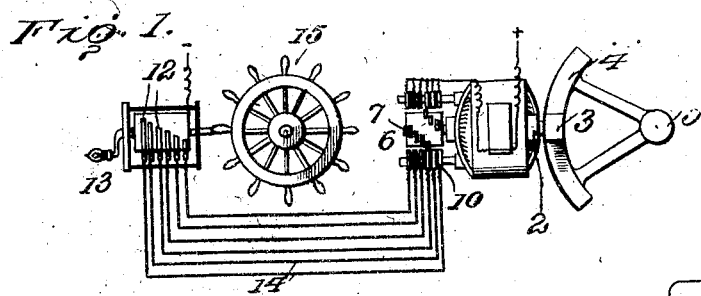

R. VAN R. SILL.
ELECTRICAL OPERATING DEVICE.
APPLICATION FILED MAR. 12, 1909.

1,049,415.

Patented Jan. 7, 1913.

Inventor
R. V. R. Sill

Attorney

---

UNITED STATES PATENT OFFICE.

RICHARD VAN R. SILL, OF NEWARK, NEW JERSEY, ASSIGNOR, BY DIRECT AND MESNE ASSIGNMENTS, TO SECONDARY CONTROLLER COMPANY, OF NEW YORK, N. Y., A CORPORATION OF NEW YORK.

ELECTRICAL OPERATING DEVICE.

1,049,415.  Specification of Letters Patent.  Patented Jan. 7, 1913.

Application filed March 12, 1909. Serial No. 482,901.

---

*To all whom it may concern:*

Be it known that I, RICHARD VAN R. SILL, of Newark, in the county of Essex and State of New Jersey, have invented certain new and useful Improvements in Electrical Operating Devices; and I do hereby declare the following to be a full, clear, and exact description of the invention, such as will enable others skilled in the art to which it appertains to make and use the same.

In an application for patent, No. 391,474, filed September 5, 1907, I have shown and described means for controlling the transmission of electric power, having special reference to the regulation of a controller which feeds current to a power motor, and the synchronism of its steps with those of a master switch, the controller being primarily adapted to electric railways of the multiple unit system.

The invention embraced by said application consists of a controller operated by a pilot motor, constant fields and governor fields for the pilot motor, and independent connections between the armature of the pilot motor and the contact surfaces of a master switch. These connections are accomplished, in the form illustrated, by providing the commutator of the pilot motor with conductor segments in staggered arrangement and connecting each of the segments with one of the armature coils or sectional windings of the pilot and with one of the contact terminals of the master switch.

The application referred to also embraces the combination of a pilot motor, as above described, with a controller, independently of the governor fields by which the rotation of the pilot motor is retarded or reversed, the former in the event of the full line voltage being suddenly thrown in at the master switch, and the reversal in the event of an overload upon the power motor, as by a short circuit. These governor fields practically render the mechanism incapable of careless operation. By reason of them the necessity of solenoids or their equivalents is entirely obviated.

The advantage of the described construction of pilot motor and its connections with the master switch is that the rotation of the pilot motor and that of the element with which its armature may be movable, as a controller drum, are synchronized with the movement of the master switch. The operator may be certain that as he notches up the master switch the pilot motor is moving to exactly the same extent and if the master switch be gradually turned the step-by-step rotation of the controller will follow without the use of solenoids. Hence the governor fields are not necessary except for a safeguard, as above stated. The peculiar form of pilot motor and its connections to a master switch are capable of adaptation to a variety of purposes apart from the regulation of a controller. They are available wherever an electric current may be used to effect a movement consequent upon the rotation of a motor armature, and are especially valuable where the element to be operated is at a distance from the master switch. One of the advantages attending their use is that the current is retained in the motor at all times and the motor is governed by its influence alone so that if the current be interrupted the armature is free to return to the starting point. Operating the master switch simply shifts the current successively through the sections of the armature; the current is not, in normal operation, cut out from the motor at all. The use of governing magnets avoids the dangers of careless operation. If when they are employed the flow of current should be interrupted and the controller be returned to the starting point under spring tension, but the operator should fail to shut off the master switch, a sudden resumption of the current could not cause the pilot motor to suddenly fly back to its original position in synchronism with the master switch as the pilot motor is, owing to the governing magnets incapable of any but a gradual step by step movement.

In the present instance I have shown a motor and controlling switch adapted to operating the steering gear of a ship.

Figure 2:
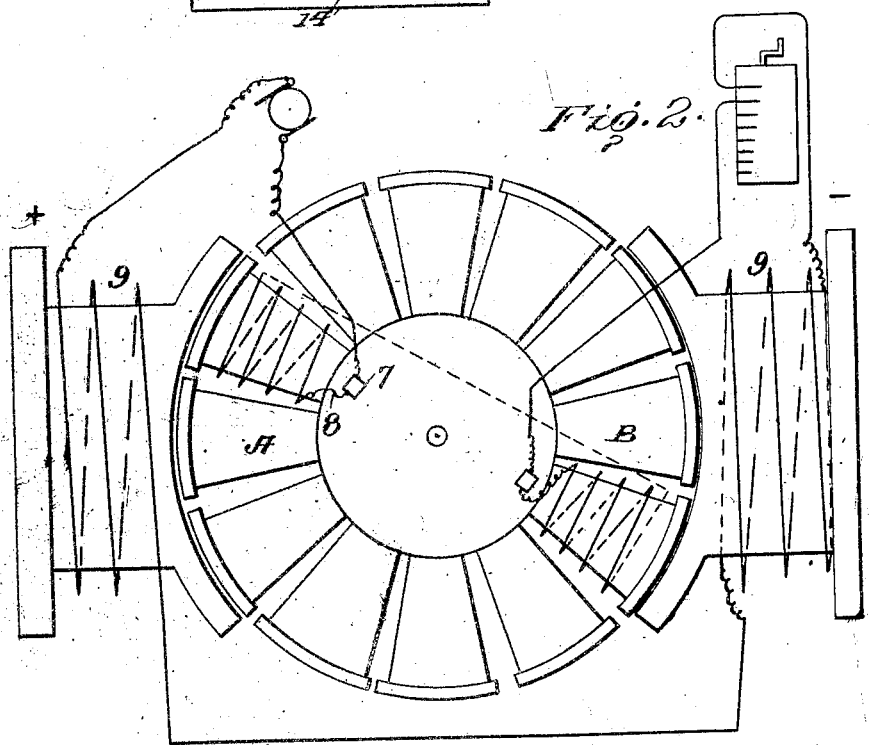
Figure 3:
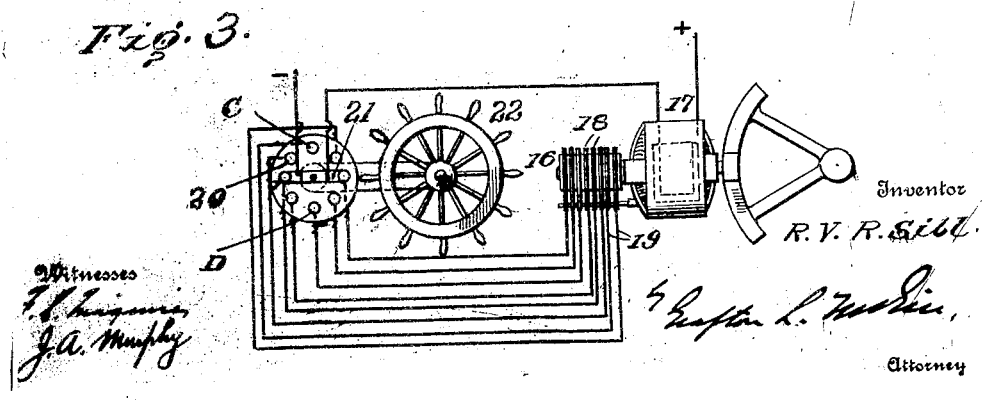

Figure 1 is a diagram of the preferred form of embodiment. Fig. 2 is a view of the pilot motor. Fig. 3 shows a modified form of embodiment.

Referring to Fig. 1, the pilot motor is shown with its armature 2 carrying a beveled pinion 3 meshing with a gear 4 carried by, and movable with, a rudder head 5. The commutator 6 of the motor is shown equipped with a series of segments 7 in staggered arrangement. As shown fully in Fig. 2, each of the segments is connected with one of the coils or sectional windings 8 of the armature of the motor and the latter are adapted to be successively influenced by magnetic fields 9 which may be in circuit with the sections 8 or they may be energized by other sources of supply. The segments 7 are shown adapted to engage brushes 10 each of which is directly connected to the terminals 12 of a switch 13 by conductors 14. I have shown the switch in the form of a master controller and movable by a steering wheel 15. Upon operating the steering wheel to transmit the current the first terminal point 12 is cut in and the current passes through its respective conductor 14 and segment 7 into the corresponding section 8. As shown in Fig. 2 the opposite sections or windings 8 are connected in circuit. On becoming excited they tend to center toward the fields 9. This causes the first step of the armature of the motor and, in consequence, a part turn of the rudder head 5. As the operation of the wheel 15 is continued the armature is correspondingly rotated, always in synchronism with the movement of the switch.

As illustrated in Fig. 2 three of the windings 8 are under the influence of each of the fields 9. Any or all of these pairs of windings may be excited at the same time. Their tendency is to center toward the magnets 9 and hence the operator may by slightly turning the wheel 15 cause one or two of the windings to be deënergized. The pair of windings remaining excited will then tend to center toward the magnets. This insures a movement of the pilot motor and the rudder in exact synchronism with the steering wheel and master switch.

In the form of embodiment shown in Fig. 3 the commutator 16 of the motor 17 is equipped with rings 18 in lieu of the staggered segments 7. Conductors 19 lead from each of these rings to one of the contact points 20 of the switch. This form of embodiment requires a double switch 21 operated by the wheel 22. The construction of the motor and the operation of the rudder are, or may be, similar to those of the corresponding parts shown in Fig. 1. The operation of a steering mechanism embodying the modified construction is, however, capable of being interfered with by dead centers. For instance, the opposite sections A, B, of the motor might, as shown in Fig. 2, be directly under the influence of the magnetic fields when the motor is at rest. Assuming that contact points C, D, Fig. 3, are the ones through which sections A, B, are energized, it will be seen that if the switch blade 21 be quickly turned to contact with points C, D, no rotation of the motor armature will result. The possibility of this contingency arising, however, is remote and the modified construction may be successfully operated for steering gears.

In the preferred form of embodiment the difficulty above referred to cannot arise for the reason that each section of the motor must be successively energized before a given section can pass from one of the fields to the other and hence there must always be a rotation of the motor armature consequent upon, and corresponding with, that of the switch.

While I have illustrated the invention as adapted to operating the rudder of a ship, yet it is available in a broad field of application. For instance it may be employed for gun pointing where an element is used corresponding to gear 4 of Fig. 1.

I claim as my invention:—

1. Electrical operating means comprising a motor, a movable element adapted to be operated by the armature of said motor, said armature having sectional windings, a switch having terminal points, independent electrical connections between each of the terminal points of said switch and one of the sectional windings of said armature, conductor segments on the commutator of said armature, and each of said segments separately connected to one of the sectional windings of the armature and to one of the terminal points of said switch.

2. Electrical operating means comprising a motor, a movable element adapted to be operated by the armature of said motor, a switch having terminal points in staggered arrangement, conductor segments on the commutator of said armature in corresponding relative arrangement to said terminal points, and each of said segments separately connected to one of the sections of the armature and to one of the terminal points of said switch.

3. In an electrical steering device, the combination with a rubber head, of a motor having its armature provided with sectional windings and in operative engagement with said rudder head and its commutator segments in staggered arrangement, a switch, each of said segments being connected to one of the sections of said motor armature and to one of the contact terminals of said switch, and a steering wheel for operating said switch.

4. In an electrical steering device, the combination with a rudder head and a pilot motor having its armature provided with sectional windings and in operative engagement with said rudder head, of a master switch, and independent electrical connections between successive sections of said windings and successive contact surfaces of said master switch, whereby the polarity of the armature may be progressively shifted as the master switch is operated.

In testimony whereof, I have signed this specification in the presence of two subscribing witnesses.

RICHARD VAN R. SILL.

Witnesses:
GRAFTON L. McGILL,
GERTRUDE C. FLYNN.